United States Patent
Liu et al.

(10) Patent No.: US 12,204,851 B2
(45) Date of Patent: Jan. 21, 2025

(54) METHOD FOR GENERATING PRE-TRAINED LANGUAGE MODEL, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Tongyang Liu, Beijing (CN); Shu Wang, Beijing (CN); Wanli Chang, Beijing (CN); Wei Zheng, Beijing (CN); Zhifan Feng, Beijing (CN); Chunguang Chai, Beijing (CN); Yong Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 337 days.

(21) Appl. No.: 17/864,636

(22) Filed: Jul. 14, 2022

(65) Prior Publication Data

US 2022/0350965 A1    Nov. 3, 2022

(30) Foreign Application Priority Data

Aug. 13, 2021    (CN) .......................... 202110931911.6

(51) Int. Cl.
G06F 40/211    (2020.01)
G06F 40/109    (2020.01)
G06F 40/30    (2020.01)
G06N 3/08    (2023.01)

(52) U.S. Cl.
CPC .......... *G06F 40/211* (2020.01); *G06F 40/109* (2020.01); *G06F 40/30* (2020.01); *G06N 3/08* (2013.01)

(58) Field of Classification Search
CPC ....... G06F 40/211; G06F 40/109; G06F 40/30
See application file for complete search history.

(56) References Cited

PUBLICATIONS

Aghajanyan, A., Okhonko, D., Lewis, M., Joshi, M., Xu, H., Ghosh, G., & Zettlemoyer, L. (2021). Htlm: Hyper-text pre-training and prompting of language models. arXiv preprint arXiv:2107.06955. (Year: 2021).*
HTLM: Hyper-Text Pre-Training and Prompting of Language Models (Year: 2021).*
Extended European Search Report of European Application No. 22185752.7-1203 dated Dec. 21, 2022, 9 pages.

(Continued)

*Primary Examiner* — Ibrahim Siddo
(74) *Attorney, Agent, or Firm* — Lippes Mathias LLP (57) ABSTRACT

A method for generating a pre-trained language model, includes: obtaining sample files; obtaining typography structure information and text information of the sample files by parsing the sample files; obtaining a plurality of task models of a pre-trained language model; obtaining a trained pre-trained language model by jointly training the pre-trained language model and the plurality of task models according to the typography structure information and the text information; and generating a target pre-trained language model by fine-tuning the trained pre-trained language model according to the typography structure information and the text information.

18 Claims, 5 Drawing Sheets

(56) References Cited

PUBLICATIONS

Aghajanyan Armen et al.: "HTLM: Hyper-Text Pre-Training and Prompting of Language Models", Jul. 14, 2021 (Jul. 14, 2021), 14 pages.

Li Junyi et al.: "Pretrained Language Model for Text Generation: A Survey", Proceedings of the Thirtieth International Joint Conference on Artificial Intelligence, May 25, 2021 (May 25, 2021), pp. 4492-4499.

Yiheng Xu et al.: "LayoutLM: Pre-training of Text and Layout for Document Image Understanding", Jun. 16, 2020 (Jun. 16, 2020), 9 pages.

Hong Teakgyu et al.: "BROS: A Layout-Aware Pre-trained Language Model for Understanding Documents", Aug. 10, 2021 (Aug. 10, 2021), 11 pages.

* cited by examiner

METHOD FOR GENERATING PRE-TRAINED LANGUAGE MODEL, ELECTRONIC DEVICE AND STORAGE MEDIUM

CROSS-REFERENCE TO RELATED APPLICATION

This application claims a priority to Chinese Patent Application No. 202110931911.6, filed on Aug. 13, 2021, the entire content of which is incorporated herein by reference.

TECHNICAL FIELD

The disclosure relates to the field of computer technologies, especially to the field of artificial intelligence (AI) technologies such as natural language processing, knowledge graph and deep learning, and in particular to a method for generating a pre-trained language model, an electronic device and a storage medium.

BACKGROUND

Files are the most important part of many services in industries such as law, finance and medicine. As an information carrier, files are written in different typography layouts according to different purposes.

Intelligent understanding of files may include key tasks such as file semantic representation, file classification, knowledge element extraction and file semantic label understanding.

Currently, the pre-trained language model of natural language processing (NLP) has proved its strong vitality in many languages and has been widely used in industries. Recently, research on a multimodal pre-trained model using visual information has attracted much attention.

SUMMARY

According to an aspect of the disclosure, a method for generating a pre-trained language model is provided. The method includes: obtaining sample files; obtaining typography structure information and text information of the sample files by parsing the sample files; obtaining a plurality of task models of a pre-trained language model; obtaining a trained pre-trained language model by jointly training the pre-trained language model and the plurality of task models according to the typography structure information and the text information; and generating a target pre-trained language model by fine-tuning the trained pre-trained language model according to the typography structure information and the text information.

According to another aspect of the disclosure, an electronic device is provided. The electronic device includes: at least one processor and a memory communicatively coupled to the at least one processor. The memory is configured to store instructions executable by the at least one processor, and when the instructions are executed by the at least one processor, the method described above is performed.

According to another aspect of the disclosure, a non-transitory computer-readable storage medium having computer instructions stored thereon is provided. The computer instructions are configured to cause a computer to perform the method described above.

BRIEF DESCRIPTION OF THE DRAWINGS

The drawings are used to better understand the solutions and do not constitute a limitation to the disclosure, in which.

DETAILED DESCRIPTION

The following describes embodiments of the disclosure with reference to the drawings, which includes various details of embodiments of the disclosure to facilitate understanding and shall be considered merely exemplary. Therefore, those of ordinary skill in the art should recognize that various changes and modifications can be made to embodiments described herein without departing from the scope and spirit of the disclosure. For clarity and conciseness, descriptions of well-known functions and structures are omitted in the following description.

A method for generating a pre-trained language model, an apparatus for generating a pre-trained language model, an electronic device and a storage medium according to embodiments of the disclosure are described with reference to the drawings.

AI is a study of making computers to simulate certain thinking processes and intelligent behaviors of humans (such as learning, reasoning, thinking and planning), which are both hardware-level technologies and software-level technologies. AI hardware technologies generally include technologies such as sensors, dedicated AI chips, cloud computing, distributed storage, and big data processing. AI software technologies mainly include computer vision technology, speech recognition technology, NLP technology and deep learning, big data processing technology, knowledge graph technology and other major directions.

NLP is an important direction in the field of computer science and the field of AI, which can realize various theories and methods for effective communication between humans and computers using natural language. NLP is a science that integrates linguistics, computer science and mathematics.

Knowledge graph is called knowledge domain visualization or knowledge domain mapping map in the library and information community, which is a series of various graphs showing the knowledge development process and structure relationship. Visualization technology is used to describe knowledge resources and their carriers, mine, analyze, construct, draw and display knowledge and their interrelationships. Knowledge graph is a combination of theories and methods of applied mathematics, graphics, information visualization technology, information science and other disciplines, and methods such as metrology citation analysis and co-occurrence analysis. Knowledge graph uses a visual graph to vividly display the core structure, development history, frontier fields and the overall knowledge structure of modern theories for the purpose of multi-disciplinary integration.

Deep learning is a new research direction in the field of machine learning. Deep learning is to learn the inherent laws and representation levels of sample data. The information obtained during these learning processes is of great help to the interpretation of data such as text, images and sounds. Its ultimate goal is to enable machines to have the ability to analyze and learn like humans, and to recognize data such as words, images and sounds. Deep learning is a complex machine learning algorithm that has achieved results in speech and image recognition far exceeding the prior art.

The method for generating a pre-trained language model according to embodiments of the disclosure may be performed by an electronic device. The electronic device may be a personal computer (PC), a tablet computer, a handheld computer, a mobile phone or a server, which is not limited herein.

In embodiments of the disclosure, the electronic device may be provided with a processing component, a storage component and a driving component. Optionally, the driving component and the processing component may be set in an integrated manner. The storage component may store an operating system, an application program or other program modules. The processing component implements the method for generating a pre-trained language model according to embodiments of the disclosure by executing the application program stored in the storage component.

Figure 1:
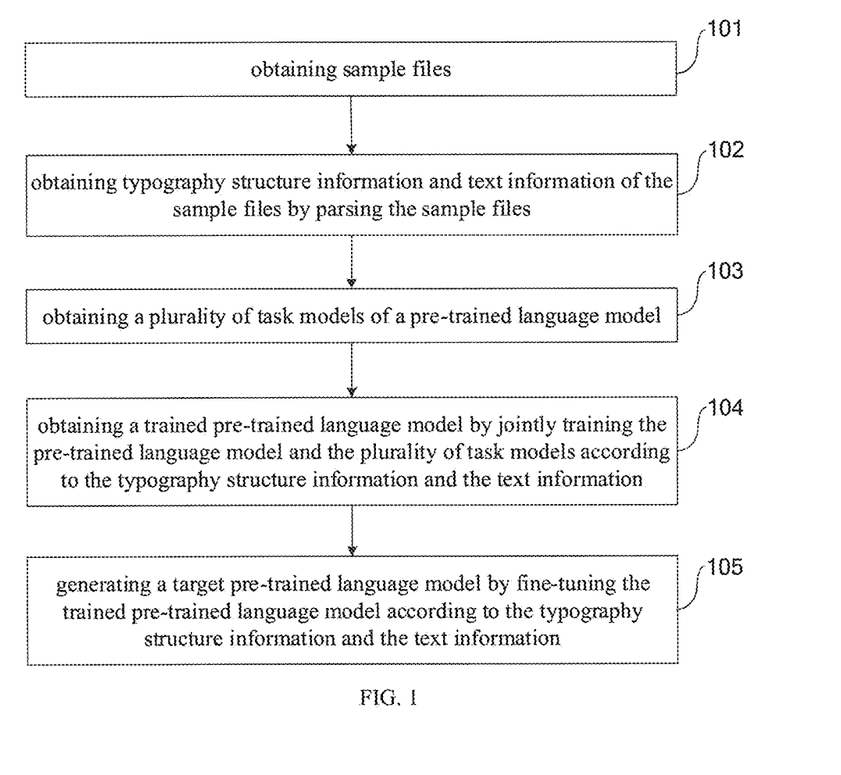
FIG. 1 is a flowchart of a method for generating a pre-trained language model according to some embodiments of the disclosure.

FIG. 1 is a flowchart of a method for generating a pre-trained language model according to some embodiments of the disclosure.

The method for generating a pre-trained language model according to embodiments of the disclosure can also be executed by an apparatus for generating a pre-trained language model according to embodiments of the disclosure. The apparatus can be configured in an electronic device. With the apparatus, sample files are obtained and parsed, to obtain typography structure information and text information of the sample files. A plurality of task models of the pre-trained language model are obtained. A trained pre-trained language model is obtained by jointly training the pre-trained language model and the plurality of task models according to the typography structure information and the text information. Finally, a target pre-trained language model is generated by fine-tuning the trained pre-trained language model according to the typography structure information and the text information. As a result, the target pre-trained language model can quickly transfer tasks and domains, which greatly reduces the cost of understanding file contents.

As a possible situation, the method for generating a pre-trained language model in embodiments of the disclosure may also be executed on a server side. The server may be a cloud server, and capable of executing the method on the cloud.

As illustrated in FIG. 1, a method for generating a pre-trained language model includes the following.

In 101, sample files are obtained. There can be multiple sample files.

It should be noted that the sample files described in embodiments may be an unstructured text with structure information. The types of the sample files may include, but are not limited to, .doc, .excel, .ppt, .pdf, .md, .html, .txt, .jpg, and .png. The sample file can be a Chinese text.

In embodiments of the disclosure, there may be multiple ways of obtaining the sample files. Relevant personnel may directly write the sample files, or the sample files may be intercepted from the network, or service files of some industries may be used as the sample files, which is not limited.

It should be noted that after the relevant personnel obtains the sample files, the sample files can be transferred to the storage space of the electronic device, so as to facilitate the subsequent use of the sample files. The storage space is not limited to an entity-based storage space, such as, a hard disk. The storage space may also be a storage space (cloud storage space) of a network hard disk connected to the electronic device.

In some embodiments of the disclosure, the pre-trained language model to be trained may be prepared in advance by the relevant personnel, and pre-stored in the storage space of the electronic device for the subsequent use.

In detail, the electronic device (e.g., a computer) can directly obtain the sample files from its own storage space, and obtain the pre-trained language model to be trained.

In 102, typography structure information and text information of the sample files are obtained by parsing the sample files.

In embodiments of the disclosure, the sample files may be parsed according to a preset parsing algorithm, to obtain the typography structure information and text information of the sample files. The preset parsing algorithm can be calibrated according to the actual situation.

In detail, after obtaining the sample files and the pre-trained language model to be trained, the electronic device can parse the sample files according to the preset parsing algorithm, to obtain the typography structure information and text information of the sample files.

As a possible situation, the sample files can also be parsed by a parsing model to obtain the typography structure information and text information of the sample files. It should be noted that the parsing model described in embodiments may be trained in advance, and pre-stored in the storage space of the electronic device, to facilitate retrieval and application of the parsing model.

The training and generation of the parsing model can be performed by a related training server. The training server can be a cloud server or a computer host. A communication connection is established between the training server and the electronic device capable of performing the method for generating a pre-trained language model according to embodiments of the disclosure, and the communication connection may be at least one of a wireless network connection and a wired network connection. The training server can send the trained parsing model to the electronic device, so that the electronic device can call it when needed, thereby greatly reducing the computing pressure of the electronic device.

In detail, after obtaining the sample files and the pre-trained language model to be trained, the electronic device can call the parsing model from its own storage space, and input the sample files into the parsing model. The sample files are parsed by the parsing model, to obtain the typography structure information and text information of the sample files output by the parsing model.

As another possible situation, the electronic device may also use a file parsing tool (e.g., a plug-in) to parse the sample files, so as to obtain the typography structure information and text information of the sample files.

It should be noted that the typography structure information described in the above embodiments may include but not limited to the following 9 types: title, subtitle, paragraph, header, footer, abstract, comment, table block and image block.

In 103, a plurality of task models of a pre-trained language model are obtained.

In embodiments of the disclosure, the task models may also be prepared in advance by the relevant personnel, and pre-stored in the storage space of the electronic device for the subsequent use.

It should be noted that the pre-trained language model described in the above-mentioned embodiments may include the above task models, that is, the task models may be a plurality of sub-models in the pre-trained language model.

In 104, a trained pre-trained language model is obtained by jointly training the pre-trained language model and the plurality of task models according to the typography structure information and the text information.

It should be noted that the joint training described in embodiments may include joint training of the pre-trained language model and the plurality of task models at the same time.

In 105, a target pre-trained language model is generated by fine-tuning the trained pre-trained language model according to the typography structure information and the text information.

In detail, after acquiring the above typography structure information and text information of the sample files, the electronic device can also acquire the task models from its own storage space. Then, the electronic device can firstly input the typography structure information and text information of the sample files into the task models respectively, and train the above pre-trained language model according to the loss values generated (output) by the task models, to obtain the trained pre-trained language model. Then, in order to improve the accuracy of the trained pre-trained language model, the electronic device can also perform fine-tuning on the trained pre-trained language model according to the typography structure information and text information, to generate the target pre-trained language model. The trained pre-trained language model can be a pre-trained model of typography structure awareness, in which the typography structure itself contains rich semantic information. The introduction of the information is helpful for fine-tuning, so that the amount of data required for fine-tuning is far less than that of the normal pre-trained language model.

In embodiments of the disclosure, firstly, the sample files are obtained and analyzed, to obtain the typography structure information and text information of the sample files. Then multiple task models of the pre-trained language model are obtained. The trained pre-trained language model is obtained by jointly training the pre-trained language model and the plurality of task models according to the typography structure information and the text information. Finally, the target pre-trained language model is generated by fine-tuning the trained pre-trained language model according to the typography structure information and the text information. As a result, the target pre-trained language model can quickly transfer tasks and domains, which greatly reduces the cost of understanding file contents.

Figure 2:
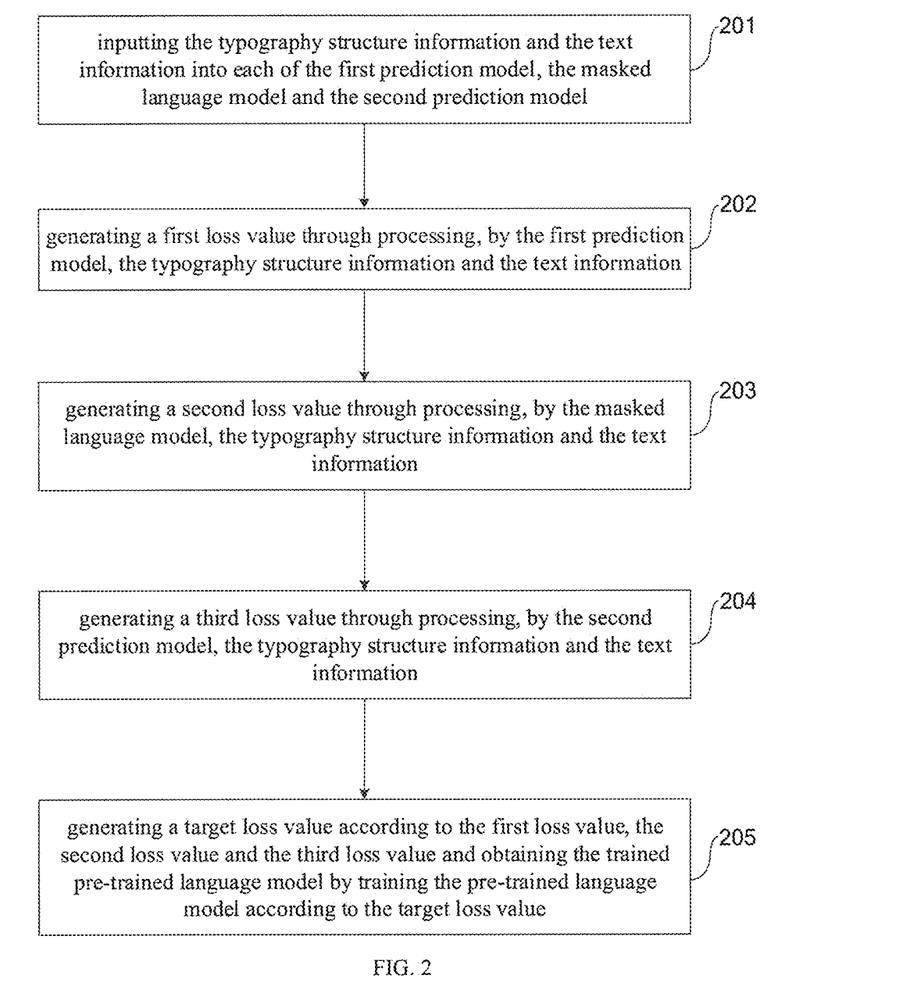
FIG. 2 is a flowchart of another method for generating a pre-trained language model according to some embodiments of the disclosure.

In order to clearly illustrate the above embodiments, in some embodiments of the disclosure, the plurality of task models may include a first prediction model, a masked language model and a second prediction model. As illustrated in FIG. 2, obtaining the trained pre-trained language model by jointly training the pre-trained language model and the plurality of task models according to the typography structure information and the text information, includes the following.

In 201, the typography structure information and the text information are input into each of the first prediction model, the masked language model and the second prediction model.

It should be noted that, the first prediction model, the masked language model and the second prediction model described in embodiments may all be trained in advance. The first prediction model may be a next sentence prediction model, and the second prediction model may be a typography structure prediction model.

In 202, a first loss value is generated through processing, by the first prediction model, the typography structure information and the text information.

In 203, a second loss value is generated through processing, by the masked language model, the typography structure information and the text information.

In 204, a third loss value is generated through processing, by the second prediction model, the typography structure information and the text information.

In detail, after obtaining the typography structure information and the text information of the above-mentioned sample files, the electronic device can also obtain (call) the first prediction model, the masked language model and the second prediction model from its own storage space. Then the electronic device input the typography structure information and the text information into each of the first prediction model, the masked language model and the second prediction model. In this way, the typography structure information and the text information are processed by the first prediction model to generate the first loss value. The typography structure information and the text information are processed through the masked language model to generate the second loss value. The typography structure information and the text information are processed through the second prediction model to generate the third loss value.

It should be noted that the first prediction model, the masked language model and the second prediction model described in embodiments can process the typography structure information and the text information simultaneously. That is, the training of each of the first prediction model, the masked language model, and the second prediction model is not arranged in sequence.

In 205, a target loss value is generated according to the first loss value, the second loss value and the third loss value, and the trained pre-trained language model is obtained by training the pre-trained language model according to the target loss value.

In detail, after obtaining the first loss value, the second loss value and the third loss value, the electronic device may add the first loss value, the second loss value and the third loss value together, to generate the target loss value. The pre-trained language model is trained according to the target loss value, to generate the trained pre-trained language model. In this way, drawbacks of training the model through the single task can be avoided, and the accuracy of the pre-trained language model can be improved.

Figure 3:
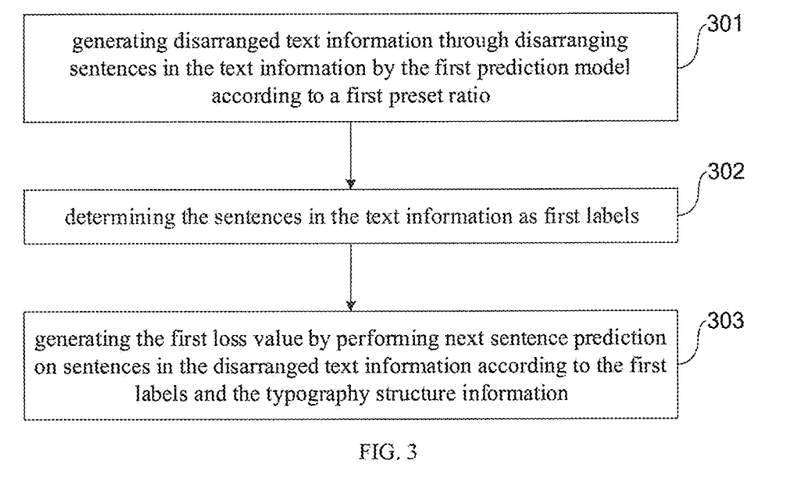
FIG. 3 is a flowchart of another method for generating a pre-trained language model according to some embodiments of the disclosure.

In order to clearly illustrate the above embodiments, in some embodiments of the disclosure, as illustrated in FIG. 3, generating the first loss value through processing, by the first prediction model, the typography structure information and the text information may include the following.

In 301, disarranged text information is generated through disarranging sentences in the text information by the first prediction model according to a first preset ratio. The first preset ratio can be calibrated according to the actual situation.

In some embodiments of the disclosure, the disarranged text information is generated through disarranging the sentences in the text information according to the first preset ratio based on a preset disarranging strategy.

In detail, after receiving the above typography structure information and text information, the first prediction model can disarrange the sentences in the text information according to the first preset ratio based on the preset disarranging strategy to generate the disarranged text information.

In 302, the sentences in the text information are determined as first labels.

It should be noted that the first labels in embodiments may include sequence information of the sentences in the text information, that is, correct sequence information of the sentences.

In 303, the first loss value is generated by performing next sentence prediction on sentences in the disarranged text information according to the first labels and the typography structure information.

In detail, the first prediction model can use its own tasks to learn the semantic representation of the typography structure, and perform the next sentence prediction on the sentences in the disarranged text information according to the first labels and the typography structure information to generate the first loss value. The first prediction model can predict whether the typography structure of the sample files is correct, and whether the next sentence of the currently predicted sentence is the real next sentence. Thus, the pre-trained language model is trained according to the first loss value, which can enrich the pre-trained language model's perception of the typography structure among sequences.

Figure 4:
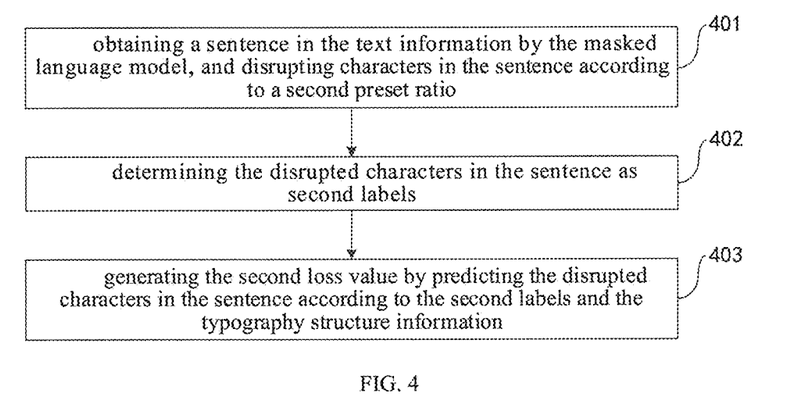
FIG. 4 is a flowchart of another method for generating a pre-trained language model according to some embodiments of the disclosure.

In some embodiments of the disclosure, as illustrated in FIG. 4, generating the second loss value through processing, by the masked language model, the typography structure information and the text information may include the following.

In 401, a sentence in the text information is obtained by the masked language model, and characters in the sentence are disrupted according to a second preset ratio. There can be multiple sentences, and the second preset ratio can be calibrated according to the actual situation.

In detail, after receiving the above typography structure information and text information, the masked language model can parse the text information to obtain the sentences in the text information, and then disrupt characters in each sentence according to the second preset ratio based on a preset disrupting strategy.

It should be noted that the preset disrupting strategy may include random mask, replacement and other disrupting modes.

In 402, the disrupted characters in the sentence are determined as second labels.

It should be noted that the second labels in embodiments may include position information of the disrupted characters in the sentence, that is, the positions of the disrupted characters in the sentence.

In 403, the second loss value is generated by predicting the disrupted characters in the sentence according to the second labels and the typography structure information.

In detail, the masked language model can predict the disrupted characters in the sentence according to the second labels and the typography structure information, and by using the semantic information (vector) of the context of the sentence, to generate the second loss value. Therefore, the training of the pre-trained language model according to the second loss value can follow language coherence characteristics, so that each character can learn its corresponding semantic representation, thereby improving the accuracy of the pre-trained language model.

Figure 5:
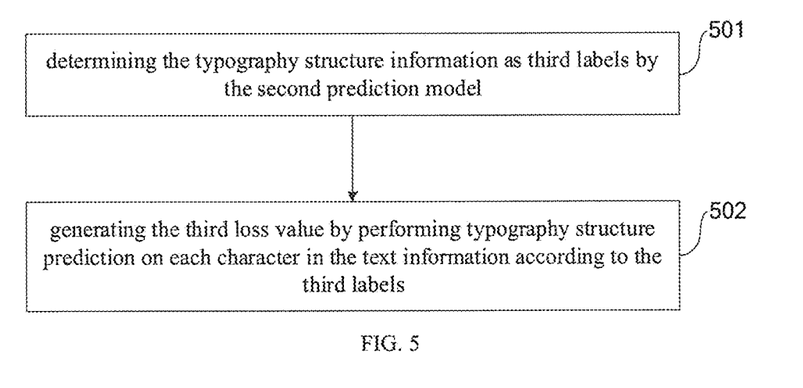
FIG. 5 is a flowchart of another method for generating a pre-trained language model according to some embodiments of the disclosure.

In some embodiments of the disclosure, as illustrated in FIG. 5, generating the third loss value through processing, by the second prediction model, the typography structure information and the text information, includes the following.

In 501, the typography structure information is determined as third labels by the second prediction model.

It should be noted that the third labels described in embodiments may include position information of the typography structure, for example, the positions of typography structures such as title, subtitle, paragraph, page header, footer, abstract, comment, table block and image block in the file.

In 502, the third loss value is generated by performing typography structure prediction on each character in the text information according to the third labels.

In detail, after receiving the above typography structure information and text information, the second prediction model can determine the typography structure information as the third labels, and perform typography structure prediction on each character in the text information according to the third labels. For example, multi-class prediction is performed on the vector (feature vector) of the characters in the text information, supervised trained model is used for representation of the typography structure information to generate the third loss value. Therefore, by training the pre-trained language model based on the third loss value, the representation of the typography structure information by the pre-trained language model can be trained in a supervised manner, thereby further improving the accuracy of the pre-trained language model.

Figure 6:
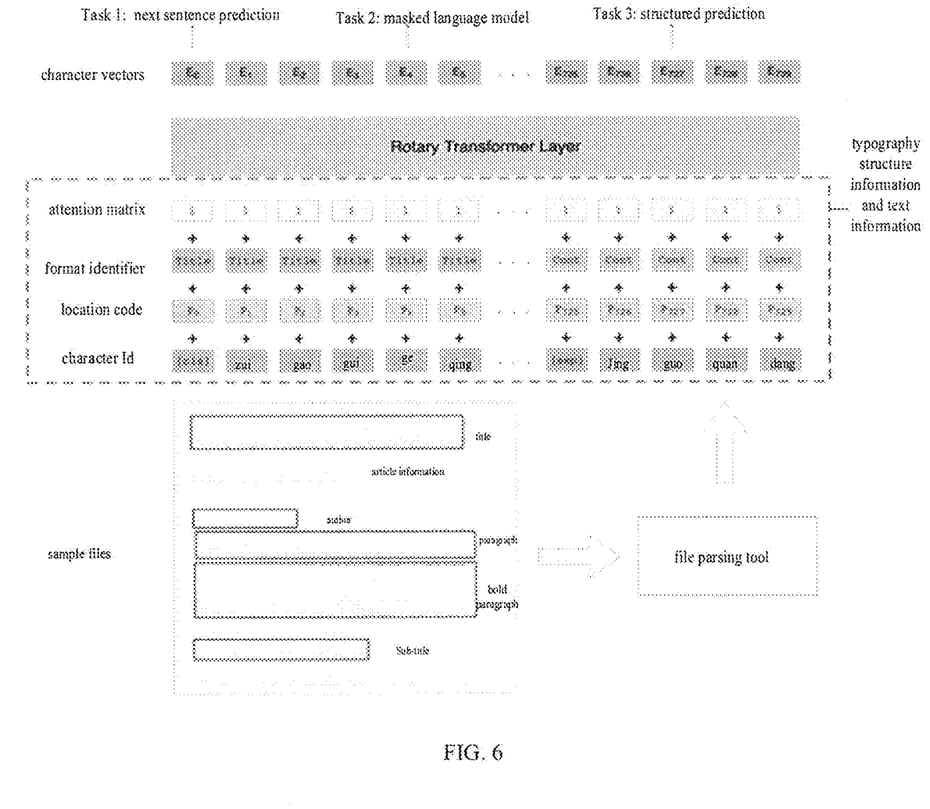
FIG. 6 is a flowchart of another method for generating a pre-trained language model according to some embodiments of the disclosure.

In some embodiments of the disclosure, as illustrated in FIG. 6, the method for generating a pre-trained language model in some embodiments of the disclosure firstly inputs the sample files into a file parsing tool to parse the sample files, so as to generate the typography structure information and the text information of the sample files. Then, the typography structure information and the text information can be processed through task 1 (next sentence prediction), task 2 (prediction by the masked language model) and task 3 (structured prediction) at the same time, to obtain the first loss value, the second loss value and the third loss value. The target loss value is generated according to the first loss value, the second loss value and the third loss value, and the trained pre-trained language model is generated by training the pre-trained language model according to the target loss value. Therefore, the advantages of the trained pre-trained language model are that there is no input length limitation, and the typography structure information is combined during encoding, which can quickly transfer tasks and domains, and greatly reduce the cost of understanding file contents.

Figure 7:
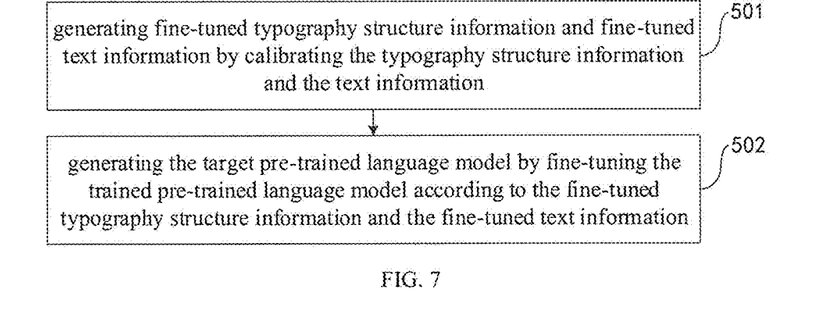
FIG. 7 is a flowchart of another method for generating a pre-trained language model according to some embodiments of the disclosure.

In some embodiments of the disclosure, as illustrated in FIG. 7, generating the target pre-trained language model by fine-tuning the trained pre-trained language model according to the typography structure information and the text information, includes the following steps.

In step 701, fine-tuned typography structure information and fine-tuned text information are generated by calibrating the typography structure information and the text information.

In some embodiments of the disclosure, the typography structure information and the text information can be calibrated respectively according to a preset fine-tuning training strategy, to generate the fine-tuned typography structure information and the fine-tuned text information. The preset fine-tuning training strategy can be calibrated according to the actual situation.

In detail, after generating the trained pre-trained language model, the electronic device can calibrate the typography structure information and the text information respectively according to the preset fine-tuning training strategy, to generate the fine-tuned typography structure information and the fine-tuned text information.

It should be noted that the fine-tuned typography structure information described in embodiments may include calibrated typography structures (labels), and the fine-tuned text information described in embodiments may include calibrated characters (labels).

In step 702, the target pre-trained language model is generated by fine-tuning the trained pre-trained language model according to the fine-tuned typography structure information and the fine-tuned text information.

In detail, after the electronic device generates the fine-tuned typography structure information and the fine-tuned text information, the fine-tuned typography structure information and the fine-tuned text information can be input into the trained pre-trained language model to generate a prediction result. The loss values are generated according to the prediction result, the calibration information in the fine-tuned typography structure information and fine-tuned text information. The electronic device can fine-tune the trained pre-trained language model according to the loss values, so as to further optimize the trained pre-trained language model and improve the output accuracy.

Figure 8:
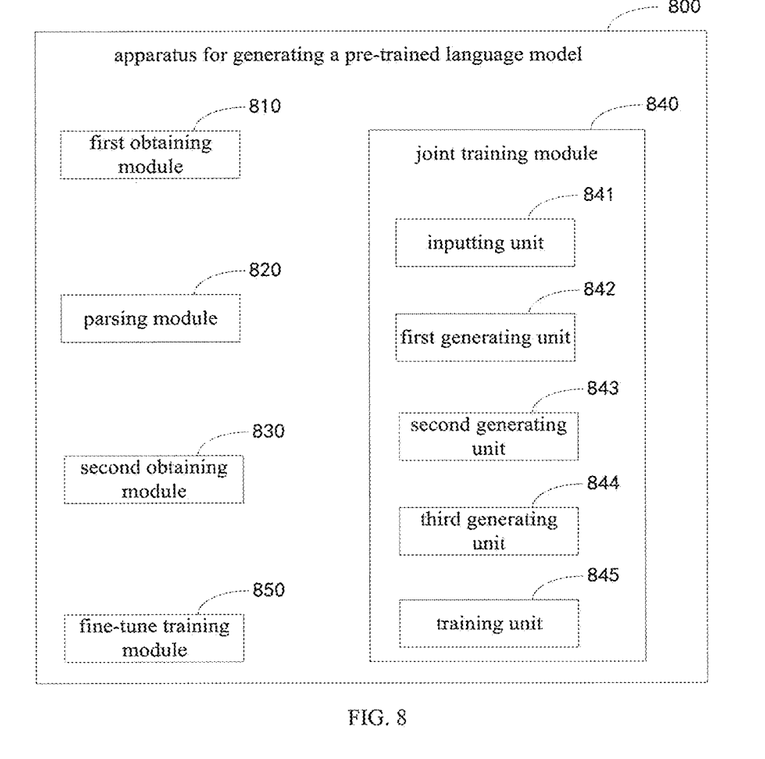
FIG. 8 is a block diagram of an apparatus for generating a pre-trained language model according to some embodiments of the disclosure.

FIG. 8 is a schematic diagram of an apparatus for generating a pre-trained language model according to some embodiments of the disclosure.

The apparatus for generating a pre-trained language model according to some embodiments of the disclosure can be configured in an electronic device. With the apparatus, the sample files are obtained. The typography structure information and text information of the sample files are obtained by parsing the sample files. The plurality of task models of the pre-trained language model are obtained. The trained pre-trained language model is obtained by jointly training the pre-trained language model and the plurality of task models according to the typography structure information and the text information. The target pre-trained language model is generated by fine-tuning the trained pre-trained language model according to the typography structure information and the text information. Therefore, the target pre-trained language model can quickly transfer tasks and domains, which greatly reduces the cost of understanding file contents.

As illustrated in FIG. 8, the apparatus 800 for generating a pre-trained language model may include: a first obtaining module 810, a parsing module 820, a second obtaining module 830, a joint training module 840 and a fine-tuning training module 850.

The first obtaining module 810 is configured to obtain sample files. There can be multiple sample files.

It should be noted that the sample files described in embodiments may be an unstructured text with structure information. The types of the sample files may include, but are not limited to, .doc, .excel, .ppt, .pdf, .md, .html, .txt, .jpg, and .png. The sample file can be a Chinese text.

In embodiments of the disclosure, there may be multiple ways of obtaining the sample files. Relevant personnel may directly write the sample files, or the sample files may be intercepted from the network, or service files of some industries may be used as the sample files, which is not limited.

It should be noted that after the relevant personnel obtains the sample files, the sample files can be transferred to the storage space of the electronic device, so as to facilitate the subsequent use of the sample files. The storage space is not limited to an entity-based storage space, such as, a hard disk. The storage space may also be a storage space (cloud storage space) of a network hard disk connected to the electronic device.

In some embodiments of the disclosure, the pre-trained language model to be trained may be prepared in advance by the relevant personnel, and pre-stored in the storage space of the electronic device for the subsequent use.

In detail, the first obtaining module 810 can directly obtain the sample files from the storage space of the electronic device, and obtain the pre-trained language model to be trained.

The parsing module 820 is configured to obtain typography structure information and text information of the sample files by parsing the sample files.

In embodiments of the disclosure, the sample files may be parsed according to a preset parsing algorithm, to obtain the typography structure information and text information of the sample files. The preset parsing algorithm can be calibrated according to the actual situation.

In detail, after the first obtaining module 810 acquires the sample files and the pre-trained language model to be trained, the parsing module 820 can parse the sample files according to the preset parsing algorithm, to acquire the typography structure information and text information of the sample files.

As a possible case, the sample files can also be parsed by a parsing model, to obtain the typography structure information and text information of the sample files. It should be noted that the parsing model described in embodiments may be trained in advance and pre-stored in the storage space of the electronic device, to facilitate retrieval and application of the parsing model.

The training and generation of the parsing model can be performed by a related training server. The training server can be a cloud server or a computer host. A communication connection is established between the training server and the electronic device capable of performing the method for generating a pre-trained language model according to embodiments of the disclosure, and the communication connection may be at least one of a wireless network connection and a wired network connection. The training server can send the trained parsing model to the electronic device, so that the electronic device can call it when needed, thereby greatly reducing the computing pressure of the electronic device.

In detail, after the first obtaining module 810 acquires the sample files and the pre-trained language model to be trained, the parsing module 820 can call the parsing model from the storage space of the electronic device, and input the sample files into the parsing model. Therefore, the sample files are parsed by the parsing model, to obtain the typography structure information and text information of the sample files output by the parsing model.

As another possible situation, the parsing module 820 may also use a file parsing tool (e.g., a plug-in) to parse the sample files, so as to obtain the typography structure information and text information of the sample files.

It should be noted that the typography structure information described in the above embodiments may include but not limited to the following 9 types: title, subtitle, paragraph, header, footer, abstract, comment, table block and image block.

The second obtaining module 830 is configured to obtain a plurality of task models of a pre-trained language model.

In some embodiments of the disclosure, the plurality of task models may also be prepared in advance by the relevant personnel, and pre-stored in the storage space of the electronic device for subsequent use.

The joint training module 840 is configured to obtain a trained pre-trained language model by jointly training the pre-trained language model and the plurality of task models according to the typography structure information and the text information.

It should be noted that the joint training described in embodiments may include joint training of the pre-trained language model and the plurality of task models at the same time.

The fine-tune training module 850 is configured to generate a target pre-trained language model by fine-tuning the trained pre-trained language model according to the typography structure information and the text information.

In detail, after the parsing module 820 obtains the above-mentioned typography structure information and text information of the sample files, the second obtaining module 830 may obtain the plurality of task models from the storage space of the electronic device. Then, the joint training module 840 may input the typography structure information and text information of the sample files into each of the plurality of task models respectively. The above-mentioned pre-trained language model is trained according to the loss values generated (output) by the plurality of task models, so as to generate the trained pre-trained language model. Then, in order to improve the accuracy of the trained pre-trained language model, the fine-tuning training module 850 may further perform fine-tuning training on the trained pre-trained language model according to the typography structure information and text information, to generate the target pre-trained language model. The trained pre-trained language model can be a pre-trained model of typography structure awareness, and the typography structure itself contains rich semantic information, thus the introduction of this information helps fine-tune training. In this way, the amount of data required for fine-tuning training is much less than the normal pre-trained language model.

In some embodiments of the disclosure, firstly, the sample files are obtained through the first obtaining module. Then the sample files are parsed through the parsing module, to obtain the typography structure information and text information of the sample files. The plurality of task models of the pre-trained language model are obtained through the second obtaining module. Through the joint training module, the pre-trained language model and the plurality of task models are jointly trained according to the typography structure information and text information, to generate the trained pre-trained language model. Finally, the trained pre-trained language model is fine-tuned according to the typography structure information and the text information by the fine-tuning training module, to generate the target pre-trained language model. As a result, the target pre-trained language model can quickly transfer tasks and domains, which greatly reduces the cost of understanding file contents.

In some embodiments of the disclosure, the plurality of task models include a first prediction model, a masked language model, and a second prediction model. As illustrated in FIG. 8, the joint training module 840 may include: an inputting unit 841, a first generating unit 842, a second generating unit 843, a third generating unit 844 and a training unit 845.

The inputting unit 841 is configured to input the typography structure information and the text information into each of the first prediction model, the masked language model and the second prediction model.

The first generating unit 842 is configured to generate a first loss value through processing by the first prediction model the typography structure information and the text information.

The second generating unit 843 is configured to generate a second loss value through processing by the masked language model the typography structure information and the text information.

The third generating unit 844 is configured to generate a third loss value through processing by the second prediction model the typography structure information and the text information.

The training unit 845 is configured to generate a target loss value according to the first loss value, the second loss value and the third loss value, and obtain the trained pre-trained language model by training the pre-trained language model according to the target loss value.

In some embodiments of the disclosure, the first generating unit 842 is further configured to: generate disarranged text information through disarranging sentences in the text information by the first prediction model according to a first preset ratio; determine the sentences in the text information as first labels; and generate the first loss value by performing next sentence prediction on sentences in the disarranged text information according to the first labels and the typography structure information.

In some embodiments of the disclosure, the second generating unit 843 is further configured to: obtain a sentence in the text information by the masked language model; disrupt characters in the sentence according to a second preset ratio; determine the disrupted characters in the sentence as second labels; and generate the second loss value by predicting the disrupted characters in the sentence according to the second labels and the typography structure information.

In some embodiments of the disclosure, the third generating unit 844 is further configured to: determine the typography structure information as third labels by the second prediction model; and generate the third loss value by performing typography structure prediction on each character in the text information according to the third labels.

In some embodiments of the disclosure, the fine-tune training module 850 is further configured to: generate fine-tuned typography structure information and fine-tuned text information by calibrating the typography structure information and the text information; and generate the target pre-trained language model by fine-tuning the trained pre-trained language model according to the fine-tuned typography structure information and the fine-tuned text information.

It should be noted that the foregoing explanations of embodiments of the method for generating a pre-trained language model are also applicable to the apparatus for generating a pre-trained language model in embodiments, which are not repeated here.

With the apparatus for generating a pre-trained language model according to some embodiments of the disclosure, firstly, the sample files are obtained through the first obtaining module. The sample files are parsed through the parsing module, to obtain the typography structure information and text information of the sample files. The task models of the pre-trained language model are obtained through the second obtaining module, and the pre-trained language model and the plurality of task models are jointly trained according to the typography structure information and text information through the joint training module, to generate the trained pre-trained language model. Finally, the trained pre-trained language model is fine-tuned according to the typography structure information and text information by the fine-tuning training module, to generate the target pre-trained language model. As a result, the target pre-trained language model can quickly transfer tasks and domains, which greatly reduces the cost of understanding file contents.

In the technical solution of the disclosure, collection, storage, use, processing, transmission, provision and disclosure of the user's personal information involved are in compliance with relevant laws and regulations, and do not violate public order and good customs.

According to embodiments of the disclosure, the disclosure also provides an electronic device, a readable storage medium and a computer program product.

Figure 9:
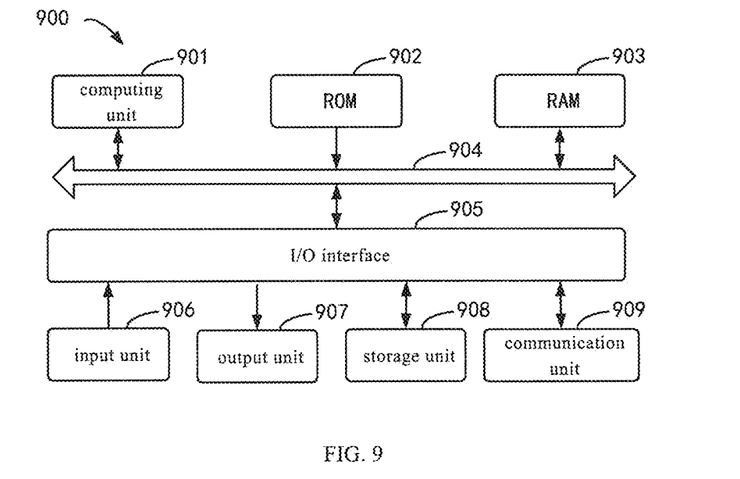
FIG. 9 is a block diagram of an electronic device for implementing a method for generating a pre-trained language model according to some embodiments of the disclosure.

FIG. 9 is a block diagram of an example electronic device 900 used to implement embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the device 900 includes a computing unit 901 performing various appropriate actions and processes based on computer programs stored in a read-only memory (ROM) 902 or computer programs loaded from the storage unit 908 to a random access memory (RAM) 903. In the RAM 903, various programs and data required for the operation of the device 900 are stored. The computing unit 901, the ROM 902, and the RAM 903 are connected to each other through a bus 904. An input/output (I/O) interface 905 is also connected to the bus 904.

Components in the device 900 are connected to the I/O interface 905, including: an input unit 906, such as a keyboard, a mouse; an outputting unit 907, such as various types of displays, speakers; a storage unit 908, such as a disk, an optical disk; and a communication unit 909, such as network cards, modems, and wireless communication transceivers. The communication unit 909 allows the device 900 to exchange information/data with other devices through a computer network such as the Internet and/or various telecommunication networks.

The computing unit 901 may be various general-purpose and/or dedicated processing components with processing and computing capabilities. Some examples of computing unit 901 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 901 executes the various methods and processes described above, such as the method for generating a pre-trained language model. For example, in some embodiments, the method may be implemented as a computer software program, which is tangibly contained in a machine-readable medium, such as the storage unit 908. In some embodiments, part or all of the computer program may be loaded and/or installed on the device 900 via the ROM 902 and/or the communication unit 909. When the computer program is loaded on the RAM 903 and executed by the computing unit 901, one or more steps of the method described above may be executed. Alternatively, in other embodiments, the computing unit 901 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and a pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and a block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in a cloud computing service system, in order to solve the existing defects of difficult management and weak business expansion in traditional physical hosting and virtual private server (VPS) services. The server can also be a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for generating a pre-trained language model, comprising:
   obtaining sample files;
   obtaining typography structure information and text information of the sample files by parsing the sample files;
   obtaining a plurality of task models of a pre-trained language model, wherein the plurality of task models comprise a first prediction model, a masked language model and a second prediction model;
   obtaining a trained pre-trained language model by jointly training the pre-trained language model and the plurality of task models according to the typography structure information and the text information; and
   generating a target pre-trained language model by fine-tuning the trained pre-trained language model according to the typography structure information and the text information.

2. The method of claim 1, wherein obtaining the trained pre-trained language model by jointly training the pre-trained language model and the plurality of task models according to the typography structure information and the text information, comprises:
   inputting the typography structure information and the text information into each of the first prediction model, the masked language model and the second prediction model;
   generating a first loss value through processing, by the first prediction model, the typography structure information and the text information;
   generating a second loss value through processing, by the masked language model, the typography structure information and the text information;
   generating a third loss value through processing, by the second prediction model, the typography structure information and the text information;
   generating a target loss value according to the first loss value, the second loss value and the third loss value; and
   obtaining the trained pre-trained language model by training the pre-trained language model according to the target loss value.

3. The method of claim 2, wherein generating the first loss value through processing, by the first prediction model, the typography structure information and the text information, comprises:
   generating disarranged text information through disarranging sentences in the text information by the first prediction model according to a first preset ratio;
   determining the sentences in the text information as first labels; and
   generating the first loss value by performing next sentence prediction on sentences in the disarranged text information according to the first labels and the typography structure information.

4. The method of claim 2, wherein generating the second loss value through processing, by the masked language model, the typography structure information and the text information, comprises:
   obtaining a sentence in the text information by the masked language model;
   disrupting characters in the sentence according to a second preset ratio;
   determining the disrupted characters in the sentence as second labels; and
   generating the second loss value by predicting the disrupted characters in the sentence according to the second labels and the typography structure information.

5. The method of claim 2, wherein generating the third loss value through processing, by the second prediction model, the typography structure information and the text information, comprises:
   determining the typography structure information as third labels by the second prediction model; and
   generating the third loss value by performing typography structure prediction on each character in the text information according to the third labels.

6. The method of claim 1, wherein generating the target pre-trained language model by fine-tuning the trained pre-trained language model according to the typography structure information and the text information, comprises:
- generating fine-tuned typography structure information and fine-tuned text information by calibrating the typography structure information and the text information; and
- generating the target pre-trained language model by fine-tuning the trained pre-trained language model according to the fine-tuned typography structure information and the fine-tuned text information.

7. An electronic device, comprising:
- at least one processor; and
- a memory communicatively coupled to the at least one processor; wherein,
- the memory is configured to store instructions executable by the at least one processor, when the instructions are executed by the at least one processor, the at least one processor is enabled to perform:
- obtaining sample files;
- obtaining typography structure information and text information of the sample files by parsing the sample files;
- obtaining a plurality of task models of a pre-trained language model, wherein the plurality of task models comprise a first prediction model, a masked language model and a second prediction model;
- obtaining a trained pre-trained language model by jointly training the pre-trained language model and the plurality of task models according to the typography structure information and the text information; and
- generating a target pre-trained language model by fine-tuning the trained pre-trained language model according to the typography structure information and the text information.

8. The device of claim 7, wherein when the instructions are executed by the at least one processor, the at least one processor is enabled to perform:
- inputting the typography structure information and the text information into each of the first prediction model, the masked language model and the second prediction model;
- generating a first loss value through processing, by the first prediction model, the typography structure information and the text information;
- generating a second loss value through processing, by the masked language model, the typography structure information and the text information;
- generating a third loss value through processing, by the second prediction model, the typography structure information and the text information;
- generating a target loss value according to the first loss value, the second loss value and the third loss value; and
- obtaining the trained pre-trained language model by training the pre-trained language model according to the target loss value.

9. The device of claim 8, wherein when the instructions are executed by the at least one processor, the at least one processor is enabled to perform:
- generating disarranged text information through disarranging sentences in the text information by the first prediction model according to a first preset ratio;
- determining the sentences in the text information as first labels; and
- generating the first loss value by performing next sentence prediction on sentences in the disarranged text information according to the first labels and the typography structure information.

10. The device of claim 8, wherein when the instructions are executed by the at least one processor, the at least one processor is enabled to perform:
- obtaining a sentence in the text information by the masked language model;
- disrupting characters in the sentence according to a second preset ratio;
- determining the disrupted characters in the sentence as second labels; and
- generating the second loss value by predicting the disrupted characters in the sentence according to the second labels and the typography structure information.

11. The device of claim 8, wherein when the instructions are executed by the at least one processor, the at least one processor is enabled to perform:
- determining the typography structure information as third labels by the second prediction model; and
- generating the third loss value by performing typography structure prediction on each character in the text information according to the third labels.

12. The device of claim 7, wherein when the instructions are executed by the at least one processor, the at least one processor is enabled to perform:
- generating fine-tuned typography structure information and fine-tuned text information by calibrating the typography structure information and the text information; and
- generating the target pre-trained language model by fine-tuning the trained pre-trained language model according to the fine-tuned typography structure information and the fine-tuned text information.

13. A non-transitory computer-readable storage medium storing computer instructions, wherein the computer instructions are configured to cause a computer to perform a method comprising:
- obtaining sample files;
- obtaining typography structure information and text information of the sample files by parsing the sample files;
- obtaining a plurality of task models of a pre-trained language model, wherein the plurality of task models comprise a first prediction model, a masked language model and a second prediction model;
- obtaining a trained pre-trained language model by jointly training the pre-trained language model and the plurality of task models according to the typography structure information and the text information; and
- generating a target pre-trained language model by fine-tuning the trained pre-trained language model according to the typography structure information and the text information.

14. The storage medium of claim 13, wherein obtaining the trained pre-trained language model by jointly training the pre-trained language model and the plurality of task models according to the typography structure information and the text information, comprises:
- inputting the typography structure information and the text information into each of the first prediction model, the masked language model and the second prediction model;
- generating a first loss value through processing, by the first prediction model, the typography structure information and the text information;

generating a second loss value through processing, by the masked language model, the typography structure information and the text information;

generating a third loss value through processing, by the second prediction model, the typography structure information and the text information;

generating a target loss value according to the first loss value, the second loss value and the third loss value; and obtaining the trained pre-trained language model by training the pre-trained language model according to the target loss value.

15. The storage medium of claim 14, wherein generating the first loss value through processing, by the first prediction model, the typography structure information and the text information, comprises:

generating disarranged text information through disarranging sentences in the text information by the first prediction model according to a first preset ratio;

determining the sentences in the text information as first labels; and generating the first loss value by performing next sentence prediction on sentences in the disarranged text information according to the first labels and the typography structure information.

16. The storage medium of claim 14, wherein generating the second loss value through processing, by the masked language model, the typography structure information and the text information, comprises:

obtaining a sentence in the text information by the masked language model;

disrupting characters in the sentence according to a second preset ratio;

determining the disrupted characters in the sentence as second labels; and generating the second loss value by predicting the disrupted characters in the sentence according to the second labels and the typography structure information.

17. The storage medium of claim 14, wherein generating the third loss value through processing, by the second prediction model, the typography structure information and the text information, comprises:

determining the typography structure information as third labels by the second prediction model; and generating the third loss value by performing typography structure prediction on each character in the text information according to the third labels.

18. The storage medium of claim 13, wherein generating the target pre-trained language model by fine-tuning the trained pre-trained language model according to the typography structure information and the text information, comprises:

generating fine-tuned typography structure information and fine-tuned text information by calibrating the typography structure information and the text information; and generating the target pre-trained language model by fine-tuning the trained pre-trained language model according to the fine-tuned typography structure information and the fine-tuned text information.

* * * * *